United States Patent [19]

Kassing

[11] 4,031,769

[45] June 28, 1977

[54] SEGMENTED SPROCKET

[75] Inventor: Milton O. Kassing, St. Louis, Mo.

[73] Assignee: Semmelmeyer-Corby Co., St. Louis, Mo.

[22] Filed: Feb. 6, 1976

[21] Appl. No.: 656,193

[52] U.S. Cl. .............................. 74/243 DR; 74/448
[51] Int. Cl.² ......................................... F16H 55/12
[58] Field of Search ............ 74/448, 447, 243 DR, 74/243 R

[56] References Cited

UNITED STATES PATENTS

| 1,506,642 | 8/1924 | Iler ...................................... 74/448 |
| 1,645,268 | 10/1927 | Walker ................................. 74/448 |
| 2,707,884 | 5/1955 | Boisuert ............................... 74/448 |
| 3,439,551 | 4/1969 | Militana ............................... 74/448 |

Primary Examiner—Samuel Scott
Assistant Examiner—Allan R. Burke
Attorney, Agent, or Firm—Rogers, Eilers & Howell

[57] ABSTRACT

A sprocket has a hub with a wide, carefully-machined, convex, outer surface, has a number of circumferentially-spaced, radially-directed, threaded sockets opening to that outer surface, and has a plurality of arcuate segments. Each of those arcuate segments has a wide, concave, carefully-machined, inner surface which is complementary to a portion of the outer surface of the hub, has a convex outer periphery with a plurality of sprocket teeth thereon, has a plurality of radially-directed, shouldered passages therethrough intermediate the teeth thereon to accommodate shouldered screws, and has end faces adjacent the roots of the end teeth which can closely confront the corresponding end faces of an adjacent arcuate segment.

2 Claims, 4 Drawing Figures

U.S. Patent    June 28, 1977    4,031,769
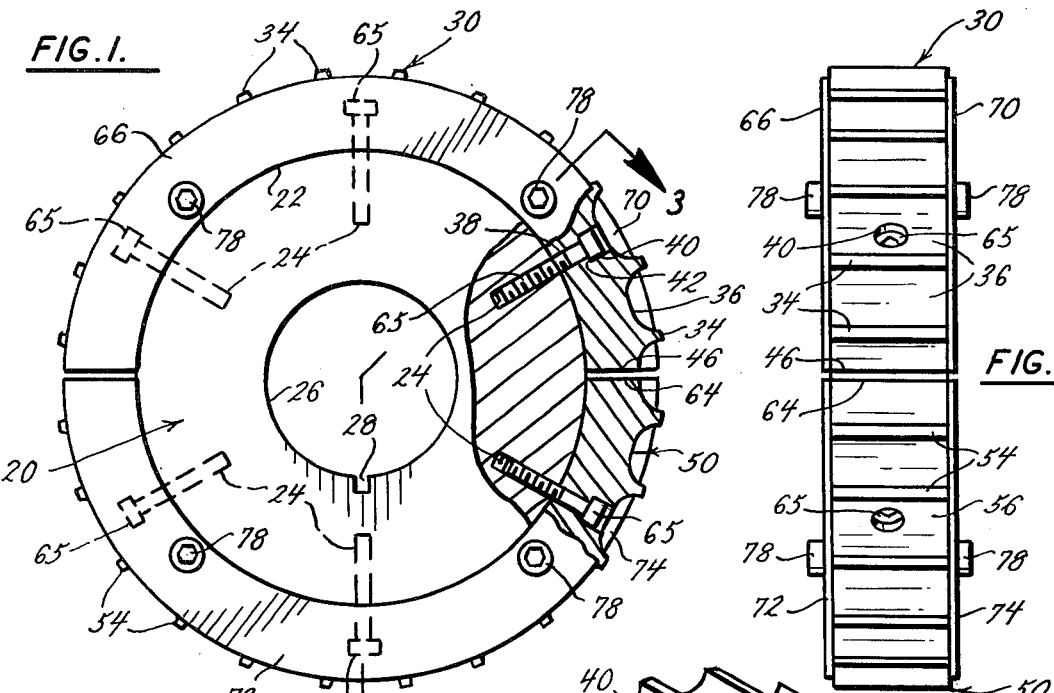
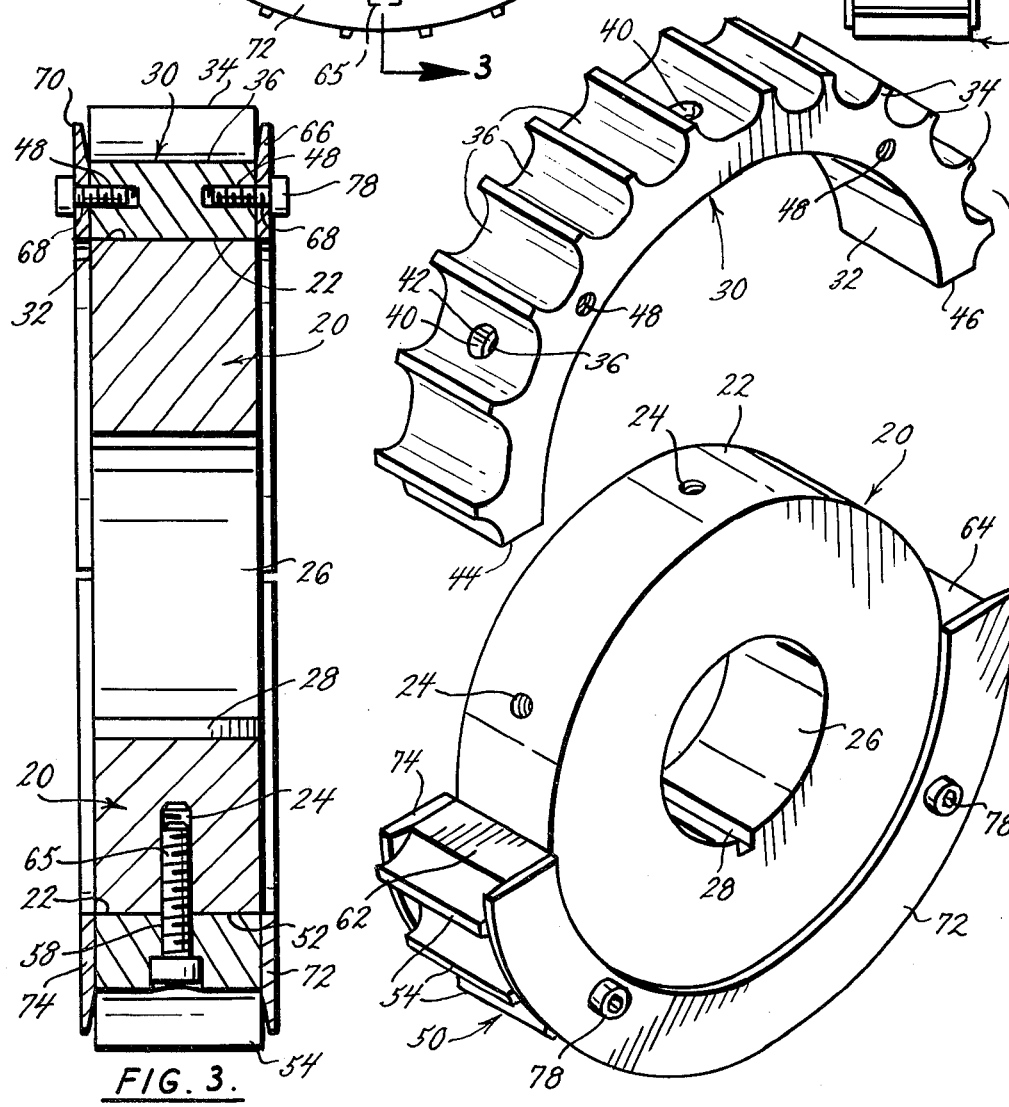

SEGMENTED SPROCKET

BACKGROUND OF THE INVENTION

Sprockets are used, in machines of various kinds, to drive sprocket chains; and, in some of those machines, the sprockets are given heavy usage. When the teeth on a one-piece sprocket become worn to the point where that sprocket must be replaced, it usually is necessary to remove the shaft on which that sprocket is mounted, to replace that sprocket, and then to re-mount that shaft and its bearings. The cost of replacing a sprocket involves the time of one or more workmen, and usually involves the cost of replacing the anti-friction bearings for the shaft on which that sprocket is mounted. As a result, the cost of replacing a worn sprocket can be substantial.

SUMMARY OF THE INVENTION

The present invention provides a segmented sprocket which has a hub with a wide, carefully-machined, convex, outer surface, has a number of circumferentially-spaced, radially-directly, threaded sockets opening to that outer surface, and has a plurality of arcuate segments. Each of those arcuate segments has a wide, concave, carefully-machined, inner surface which is complementary to a portion of the outer surface of the hub, has a convex outer periphery with a plurality of sprocket teeth thereon, has a plurality of radially-directed, shouldered passages therethrough intermediate the teeth thereon to accommodate shouldered screws, and has end faces adjacent the roots of the end teeth which can closely confront the corresponding end faces of an adjacent arcuate segment. The hub of the segmented sprocket can be mounted on a shaft of a machine which utilizes a sprocket chain, and that machine can be a new machine or it can be a machine which has been in use long enough to require replacement of a one-piece sprocket therein. When the teeth of one or more of the arcuate segments of the segmented sprocket of the present invention eventually become worn, it is not necessary to remove the shaft on which that segmented sprocket is mounted. Instead, it is only necessary to remove the shouldered screws which normally hold the arcuate segments in engagement with the hub, to replace the worn arcuate segments with replacement arcuate segments, and to use the shouldered screws to secure the replacement arcuate segments to the hub. As a result, the arcuate segments of the segmented sprocket of the present invention can be removed and replaced in a matter of minutes—even where that segmented sprocket is located in a position where access can be had only to the periphery thereof. It is, therefore, an object of the present invention to provide a sprocket which has a hub with a wide, carefully-machined, convex, outer surface, which has a number of circumferentially-spaced, radially-directed, threaded sockets opening to that outer surface, and which has a plurality of arcuate segments — each of which has a wide, concave, carefully-machined, inner surface which is complementary to a portion of the outer surface of the hub, has a convex outer periphery with a plurality of sprocket teeth thereon, has a plurality of radially-directed, shouldered passages therethrough intermediate the teeth thereon to accommodate shouldered screws, and has end faces adjacent the roots of the end teeth which can closely confront the corresponding ends faces of an adjacent arcuate segment.

The arcuate segments of the segmented sprocket of the present invention can be equipped with segmented side plates, whenever it is desirable to have that segmented sprocket help resist axial shifting of the sprocket chain used with that segmented sprocket. Those segmented side plates are secured directly to the arcuate segments, and they are not directly secured to the hub of that segmented sprocket. As a result, the installation and removal of the arcuate segments of the segmented sprocket provides installation and removal of the segmented side plates. This is important; because it facilitates the installation and removal of the segmented side plates in locations where access to even one side of the segmented sprocket would be very difficult. It is, therefore, an object of the present invention to provide a segmented sprocket which has segmented side plates that are secured directly to the arcuate segments of that segmented sprocket and that are not directly secured to the hub of that segmented sprocket.

The wide, concave, carefully-machined, inner surface of each arcuate segment of the segmented sprocket of the present invention is complementary to a corresponding portion of the wide, carefully-machined, convex outer surface of the hub of that segmented sprocket. Further, the wide, concave, carefully-machined, inner surface of each arcuate segment has an angular extent greater than 90°. Consequently, when the shouldered screws are used to hold the arcuate segments in engagement with the hub, the bearing areas between each of those arcuate segments and that hub are wide enough and long enough to provide precise, automatic, anti-tilting alignment of the axes of generation of the inner surfaces of those arcuate segments with the axis of generation of the outer surface of the hub. It is, therefore, an object of the present invention to provide each of the arcuate segments of a segmented sprocket with a wide, concave, carefully-machined, inner surface that has an angular extent greateer than 90°.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

BRIEF DESCRIPTION OF THE DRAWING

In the drawing,

FIG. 1 is a partially-sectioned, side elevational, view of one preferred embodiment of segmented sprocket which is made in accordance with the principles and teachings of the present invention, FIG. 2 is a front elevational view of the segmented sprocket of FIG. 1, FIG. 3 is a sectional view, on a larger scale, through the segmented sprocket of FIG. 1, and it is taken along the broken plane indicated by the broken line 3—3 in FIG. 1, and FIG. 4 is an exploded view of the segmented sprocket of FIG. 1 sans two side plate segments.

DETAILED DESCRIPTION OF THE PREFERRED EMBODIMENTS

Referring to the drawing in detail, the numeral 20 generally deontes the hub of one preferred embodiment of segmented sprocket which is made in accordance with the principles and teachings of the present invention. That hub is preferably formed from bar stock; and it has a wide, carefully-machined, convex, outer surface 22. Six radially-directed, circumferentially-spaced, threaded sockets 24 are formed in the hub 20; and those sprockets open to the outer surface 22. The numeral 26 denotes a bored inner surface which is concentric with the outer surface 22; and a keyway 28 communicates with that inner surface. The axial dimension of the hub 20 is long enough to enable that hub to have a solid, tilt-free engagement with a shaft on which it is to be mounted.

The numeral 30 generally denotes a segment which is arcuate in side elevation; and that segment has a wide, concave, carefully-machined, inner surface 32. The radius of generation of the inner surface 32 is substantially the same as the radius of generation of the outer surface 22 of the hub 20. A number of sprocket teeth 34 are formed on the outer periphery on the arcuate segment 30; and the spaces between those teeth are denoted by the numeral 36. As indicated particularly by FIG. 3, the axial dimensions of the teeth 34 are the same as the axial dimension of the inner surface 32; and the latter axial dimension is the same as the axial dimension of the outer surface 22 of the hub 20.

The numeral 38 denotes three passages which are formed in the arcuate segment 30; and each of those passages is radially directed and is in register with one of the spaces 36. Each of the passages 38 has an enlarged outer end 40 of cylindrical configuration; and those outer ends coact with the inner portions of those passages to define annular shoulders 42. As a result, each of the passages 38 is a shouldered passage which extends radially of the segment 30 and which has an enlarged outer end that opens to one of the spaces 36 of the arcuate segment 30.

The numeral 44 denotes one end face of the arcuate segment 30, and the numeral 46 denotes the other end face of that arcuate segment. Those end faces are approximately radially directed relative to the axis of generation of the inner surface 32.

The numeral 48 denotes threaded sockets which are axially-directed and which extend inwardly from the side faces of the arcuate segment 30. Each side face of that arcuate segment has two circumferentially-spaced threaded sockets 48; and those threaded sockets are aligned with two corresponding threaded sockets which extend inwardly from the opposite side face of that arcuate segment. The threaded sockets 48 are displaced circumferentially from the shouldered passages 38.

The numeral 50 generally denotes a second segment which is arcuate in side elevation. If the total number of teeth, that are provided by the arcuate segments 30 and 50, is an even number, the arcuate segment 50 preferably will be identical to the arcuate segment 30. On the other hand, if the total number of teeth, that are provided by the arcuate segments 30 and 50, is an odd number, the circumferential dimension of the arcuate segment 50 will differ from the circumferential dimension of the arcuate segment 30 by the pitch of the segmented sprocket. That pitch is the center-to-center distance at the pitch circle between adjacent teeth on either of the arcuate segments 30 and 50.

The arcuate segment 50 has a wide, concave, carefully-machined inner surface 52 which is substantially identical to the inner surface 32 on the arcuate segment 30. A number of sprocket teeth 54 are formed on the outer periphery of the arcuate segment 50; and the spaces between those teeth are denoted by the numeral 56. The arcuate segment 50 has three radially-directed shouldered passages 58 therethrough. In addition, that arcuate segment has four axially-directed, threaded sockets, not shown, therein. Those threaded sockets are displaced circumferentially from the shouldered passages 58.

The radius of generation of the inner surface 52 is substantially the same as the radius of generation of the outer surface 22 of the hub 20. The sprocket teeth 54 on the arcuate segment 50 have the exact same configuration and pitch as the sprockets teeth 34 on the arcuate segment 30. The shouldered passages 58 of the arcuate segment 50 are effectively idential to the shouldered passages 38 of the arcuate segment 30. Similarly, the threaded sockets, not shown, of the arcuate segment 50 are effectively identical to the threaded sockets 48 of the arcuate segment 30.

The arcuate segments 30 and 50 can be made from metal, plastic-reinforced fabric, or other suitable material. Those arcuate segments preferably will be formed from a length of seamless tubing. In forming those arcuate segments from that length of seamless tubing, that length of seamless tubing will be suitably held within the chuck of a machine tool which will accurately machine the inner surface of that length of seamless tubing. Thereafter, that length of seamless tubing can be mounted within a hobbing machine, by having the rotatable mount of that hobbing machine grip the inner surface of that seamless tubing. The last step in the forming of the arcuate segments 30 and 50 is making of two axially-directed cuts in the length of seamless tubing. One of those cuts will form the ends 44 and 62, respectively, of the arcuate segments 30 and 50, while the other of those cuts will form the ends 46 and 64, respectively, of the arcuate segments 30 and 50.

The axial dimension of the inner surface of each of the arcuate segments 30 and 50, and the axial dimension of the outer surface of the hub 20 are greater than the pitch of the segmented sprocket. In addition, the circumferential extent of the inner surface of each of the arcuate segments 30 and 50 is greater than ninety degrees. Further, the cuts in the length of seamless tubing, which forms the ends 44 and 46 of the arcuate segment 30 and the ends 62 and 64 of the arcuate segment 50, produce finite, albeit minute, gaps between the confronting ends 44 and 62 and between the confronting ends 46 64. As a result, the inner surface 32 and 52, respectively, of the arcuate segments 30 and 50 will coact with the outer surface 22 of the hub 20 to provide precise, intimate, automatic, anti-tilting alignment of the axes of generation of those inner surfaces with that outer surface—irrespective of any manufacturing tolerances in the machining of those arcuate segments or of that hub. This means that a mechanic in the field can install the arcuate segments 30 and 50 with as much precision and accuracy as can an assembler in a factory where sprockets are manufactured. All that a mechanic need do is place the inner surface 32 of arcuate segment 30 in engagement with the outer surface 22 of hub 20, align the shouldered passages 38 with the threaded sockets 24, pass the shanks of shouldered screws 65—which are shown as Allen screws—through those shouldered passages and into those threaded sockets, and then tighten those shouldered screws. Thereafter, he will do the same for the arcuate segment 50.

The numeral 66 denotes a semi-annular plate which has an outer radius that is about the same as the radius of the pitch circle of the teeth 34 of the arcuate segment 30 or of the teeth 54 of the arcuate segment 50. That semi-annular plate has an inner radius which is shown as being about the same as the radius of the outer surface 22 of the hub 20; and the outer portion of the inner face of that semi-annular plate is inclined to make the outer portion of that semi-annular plate thinner than the inner portion of that semi-annular plate. The semi-annular plate 66 has circumferentially-spaced passages 68 therethrough. The numerals 70, 72 and 74 denote additional semi-annular plates which preferably will be substantially identical to the semi-annular plate 66. The semi-annular plate 70 will be identical to the semi-annular plate 66; and the circumferential extent of each of them will equal the circumferential extent of the arcuate segment 30. The semi-annular plate 72 will be identical to the semi-annular plate 74; and the circumferential extent of each of them will equal the circumferential extent of the arcuate segment 50.

The semi-annular plate 66 and 70 can be disposed at the opposite faces of the arcuate segment 30, and can have the passages 68 therein aligned with the threaded sockets 48 in those faces. Thereafter, shouldered screws 78—which are shown as Allen screw—can be passed through those passges and seated in those threaded sockets to fixedly secure the semi-annular plates 66 and 70 to the opposite faces of the arcuate segment 30. Similarly, the semi-annular plates 72 and 74 can be set in register with the opposite faces of the arcuate segment 50, and the passages 68 in those semi-annular plates can be set in register with the threaded sockets 48 in that arcuate segment. Thereafter, shouldered screws 78 can be passed through those passages and seated in those threaded sockets.

As shown by the drawing, the inner radii of the semi-annular plates 66, 70, 72 and 74 are the same as the radii of curvature of the inner surfaces 32 and 52, respectively, of the arcuate segments 30 and 50. However, if desired, the inner radii of the semi-annular plates 66, 70, 72, and 74 can be made larger or smaller than the radii of curvature of the inner surfaces 32 and 52. Importantly, the semi-annular plates 66, 70, 72 and 74 are secured directly to the arcuate segments 30 and 50 rather than to the hub 20. As a result, those semi-annular plates can be separated from the hub 20 by the removal of the radially-directed shouldered screws 65 rather than by the removal of the axially-directed shouldered screws 78. In this way, the semi-annular plates 66, 70, 72 and 74 can be installed and removed from hubs which are in locations where it would be impossible to remove and insert axially-directed shouldered screws.

The axial dimension of each of the arcuate segments 30 and 50 is at least equal to the length of each pivot of the chain which is to be engaged by the teeth on those arcuate segments. As a result, the semi-annular plates 66, 70, 72 and 74 will not impede movement of those pivots into and out of the spaces 36 and 56 between the teeth on those arcuate segments. All of this means that a mechanic in the field can, whenever desired, add segmented side plates to the arcuate segments of the segmented sprocket of the present invention without disturbing the shaft on which that segmented sprocket is mounted. Thereafter, those segmented side plates will positively limit axial displacement of the sprocket chain relative to the segmented sprocket.

The segmented sprocket provided by the present invention is very useful with tabletop sprocket chains. However, that segmented sprocket can be used with other sprocket chains.

The hub 20 can have arcuate segments of different sizes and configurations secured to it. Although the radii of generation of the inner surfaces of all of those arcuate segments must be identical, the radii of the pitch circles of those arcuate segments can differ considerably. Further, the configurations and numbers of the teeth at the outer peripheries of those arcuate segments can differ considerably.

Whereas the drawing and accompanying description have shown and described one preferred embodiment of the present invention it should be apparent to those skilled in the art that various changes may be made in the form of the invention without affecting the scope thereof.

What I claim is:

1. A sprocket for tabletop chain which comprises a hub plus a plurality of segments that intimately encircle said hub, said hub having a central opening therethrough to accommodate a shaft and having a wide, machined, convex, outer surface thereon and having a plurality of radially-directed, circumferentially-spaced, threaded sockets therein which are spaced outwardly from said central opening and which open to said outer surface, each of said segments being arcuate in side elevation and having a wide, machined, concave, inner surface thereon and having a plurality of sprocket teeth at the outer periphery thereof and having a plurality of radially-directed, circumferentially-spaced, shouldered passages extending all the way therethrough, said sprocket teeth and the portions of said segments which are intermediate the roots of said sprocket teeth defining spaces between adjacent sprocket teeth, said radially-directed, circumferentially-spaced shouldered passages in said segments being formed so they are permanently in register with some of said spaces between adjacent sprocket teeth, said some of said spaces between adjacent sprocket teeth and said radially-directed, circumferentially-spaced shouldered passages in said segments being disposed in register with said radially-directed, circumferentially-spaced threaded sockets in said hub, the shoulders of said radially-directed, circumferentially-spaced shouldered passages in said segments opening to said some of said spaces between adjacent sprocket teeth, the width of each of said segments and of each sprocket tooth thereon being substantially equal to the width of said outer surface of said hub, the length of each of said some spaces between said adjacent sprocket teeth being greater, in a direction parallel to the geometric axis of said hub, than the diameter of the shoulder of the radially-directed, circumferentially-spaced, shouldered passage which opens to said some space, said shoulders of said radially-directed, circumferentially-spaced shouldered passages in said segments being spaced substantial distances inwardly from the ends of said spaces between adjacent sprocket teeth to assure full strength for those portions of said segments which are intermediate said shoulders of said radially-directed, circumferentially-spaced shouldered passages in said segments and said ends of said some spaces between adjacent sprocket teeth, the width of each of said segments being at least as great as the pitch of said sprocket teeth, and fasteners, which have the heads thereof telescoped into said shoulders of said radially-directed, circumferentially-spaced shouldered passages in said some spaces between said sprocket teeth to be clear of all parts of said tabletop chain and which have the shanks thereof telescoped into said radially-directed, circumferentially-spaced, threaded sockets in said hub.

2. A sprocket for tabletop chain which comprises a hub plus a plurality of segments that intimately encircle said hub, said hub having a central opening therethrough to accommodate a shaft and having a wide, machined, convex, outer surface thereon and having a plurality of radially-directed, circumferentially-spaced, threaded sockets therein which are spaced outwardly from said central opening and which open to said outer surface, each of said segments being arcuate in side elevation and having a wide, machined, concave, inner surface thereon and having a plurality of sprocket teeth at the outer periphery thereof and having a plurality of radially-directed, circumferentially-spaced, shouldered passages extending all the way therethrough, said sprocket teeth and the portions of said segments which are intermediate the roots of said sprocket teeth defining spaces between adjacent sprocket teeth, said radially-directed, circumferentially-spaced shouldered passages in said segments being formed so they are permanently in register with some of said spaces between adjacent sprocket teeth, said some of said spaces between adjacent sprocket teeth and said radially-directed, circumferentially-spaced shouldered passages in said segments being disposed in register with said radially-directed, circumferentially-spaced threaded sockets in said hub, the shoulders of said radially-directed, circumferentially-spaced shouldered passages in said segments opening to said some of said spaces between adjacent sprocket teeth, the width of each of said segments and of each sprocket tooth thereon being substantially equal to the width of said outer surface of said hub, the length of each of said some spaces between said adjacent sprocket teeth being greater, in a direction parallel to the geometric axis of said hub, than the diameter of the shoulder of the radially-directed, circumferentially-spaced, shouldered passage which opens to said some space, said shoulders of said radially-directed, circumferentially-spaced shouldered passages in said segments being spaced substantial distances inwardly from the ends of said spaces between adjacent sprocket teeth to assure full strength for those portions of said segments which are intermediate said shoulders of said radially directed, circumferentially-spaced shouldered passages in said segments and said ends of said some spaces between adjacent sprocket teeth, the width of each of said segments being at least as great as the pitch of said sprocket teeth, and fasteners which have the heads thereof telescoped into said shoulders of said radially-directed, circumferentially-spaced shouldered passages in said some spaces between said segments to be clear of all parts of said tabletop chain and which have the shanks therefore telescoped into said radially-directed, circumferentially-spaced, threaded sockets in said hub, each of said segments having threaded sockets in at least one side face thereof which have axes generally parallel to said geometric axis of said hub when said segments are assembled with said hub, a segmented annular, side plate disposable in engagement with said one side faces of said segments, said segmented, annular, side plate having a plurality of passages therethrough which can be disposed in register with said threaded sockets in said segments, and fasteners having the shanks thereof passing through said passages in said segmented annular side plate and seated in said threaded sockets in said segments to releasably secure said segmented annular side plate to said one side faces of said segments, whereby said segmented annular side plate is not directly secured to said hub but is indirectly secured to said hub by being secured to said segments and by said segments being secured to said hub.

* * * * *